United States Patent [19]

Weisser

[11] Patent Number: 5,641,130

[45] Date of Patent: Jun. 24, 1997

[54] DRIVE ARRANGEMENT FOR MAGNETIC TAPE CASSETTE RECORDERS

[75] Inventor: Fritz Weisser, St. Georgen, Germany

[73] Assignee: Deutsche Thomson-Brandt GmbH, Villingen-Schwenningen, Germany

[21] Appl. No.: 371,249

[22] Filed: Jan. 11, 1995

[30] Foreign Application Priority Data

Jan. 31, 1994 [DE] Germany .................... 44 02 789.3

[51] Int. Cl.$^6$ .................... G11B 15/32; G03B 1/04
[52] U.S. Cl. .................... 242/356.5; 242/356.7; 360/96.3
[58] Field of Search .................... 242/356.5, 356.7; 360/96.3, 96.4

[56] References Cited

U.S. PATENT DOCUMENTS

| | | | |
|---|---|---|---|
| 3,532,293 | 10/1970 | Rose | 242/200 |
| 4,499,783 | 2/1985 | Takemasa | 74/411 |
| 4,681,281 | 7/1987 | Aarts et al. | 242/356.5 |
| 4,709,871 | 12/1987 | Tanaka et al. | 242/356.5 |
| 5,331,481 | 7/1994 | Schandl et al. | 360/85 |

FOREIGN PATENT DOCUMENTS

| | | |
|---|---|---|
| 3200279 | 9/1982 | Germany . |
| 3935150 | 10/1990 | Germany . |

Primary Examiner—John Q. Nguyen
Attorney, Agent, or Firm—Joseph S. Tripoli; Joseph J. Laks; Thomas F. Lenihan

[57] ABSTRACT

A magnetic tape cassette recorder, comprising: take-up and feed spools for winding and unwinding a magnetic tape carried in a removable cassette; a tumbler gear mounted for swinging motion about a stationary shaft and movable between the take-up and feed spools; a motor, disposed outside the cassette when the cassette is operatively inserted in the recorder, for selectively driving the take-up and feed spools through the tumbler gear; a capstan driven by the motor; a pinch roller for pressing the magnetic tape against the capstan; a transmission mechanism driven by the motor and having a planetary gear assembly, including a planet carrier, for driving the tumbler gear; first and second annular coupling parts rotatably stacked along the stationary shaft; a third coupling part connected to the planet carrier and rotatably stacked between the first and second coupling parts, defining respective sets of opposing facing surfaces between the third coupling part and each of the first and second coupling parts; a frictional element stacked between each of the respective sets of opposing facing surfaces; and, a stop lever for selectively preventing: (a.) one of the first and second coupling parts from rotating; (b.) both of the first and second coupling parts from rotating; and, (c.) both of the first and second coupling parts and the planet carrier from rotating, thereby controlling coupling forces driving the take-up and feed spools under different operating modes.

24 Claims, 4 Drawing Sheets

FIG. 4

DRIVE ARRANGEMENT FOR MAGNETIC TAPE CASSETTE RECORDERS

BACKGROUND OF THE INVENTION

1. Field of the Invention

The invention relates to magnetic tape cassette recorders with take-up and feed spools for driving tape reels, between which a magnetic tape is moved backward and forward inside the tape-carrying cassette which is placed on the winding spools, and in particular, to adjustable frictional clutches for such recorders.

2. Description of Related Art

Magnetic tape cassette recorders are known in which a capstan motor provided to drive the magnetic tape also drives the winding spools, such as described in DE 3935150, corresponding to U.S. Pat. No. 5,331,481—Schandl and Weisser. A capstan drives the magnetic tape outside of the magnetic tape cassette covering the two winding spools. The capstan motor primarily drives the magnetic tape via the capstan. It also drives the take-up or feed spool selected at the time, these simply being called winding spools in the following, via a drive element, which is a planetary gear system comprising a friction clutch and a tumbler gear, which is non-positively connected to the winding spool which is pulling at the time. Magnetic tape cassette recorders of this type are used as information recording and/or playback equipment, especially in the video and audio field.

The coupling force, which is of a different magnitude for the different operating states, can be adjusted by a clutch ring, which can be moved vertically by a lever, as in U.S. Pat. No. 5,331,481. The contact pressure of the vertically mobile clutch ring against the lower part of the planet carrier, which can rotate about the common stationary shaft, can be adjusted by a motor, e.g. the threading motor, controlling the operating modes, e.g. playback, reverse, search, rewind, via the lever and a cam disc. A compression spring disposed about the stationary shaft presses the planet carrier onto the clutch ring. The planetary gear system can be connected for rewind through projections on the lower planet carrier engaging in recesses in the element, for example a pulley, which is embraced by the drive element, for example a belt, with the assistance of the spring. Because of the coupling between the pulley driven by means of the capstan motor and the planet carrier, the ring gear of the planetary gear system and thus the tumbler gear meshing with this gear are directly driven via the planet carrier.

Although this construction has proved successful in practice, because the planetary gear system is connected by using projections and recesses, it requires very accurately produced components and, when using a compression spring to guarantee a constant coupling force, also close component tolerances.

SUMMARY OF THE INVENTION

It is an object of the invention is to provide a new and improved drive for the winding spools.

It is another object of the invention to provide a new and improved drive for the winding spools having a new and improved adjustable frictional clutch.

Basically, as in the case of the arrangement according to U.S. Pat. No. 5,331,481, a planetary gear system is firstly connected upstream of the tumbler gear driving the winding spools for winding up or unwinding the magnetic tape, which system cooperates with a friction clutch. The capstan motor for the magnetic tape drives a drive element which may advantageously be a belt and which is connected to the planetary gear system. The tumbler gear is disposed so that it can swing about a stationary shaft such that it can engage both with the take-up and the feed spool. The stationary shaft may advantageously serve as the central shaft of the arrangement consisting of the planetary gear system and the friction clutch.

A pinch roller presses the magnetic tape against the capstan of the capstan motor. This pinch roller should be made of a flexible, e.g. non-slip material, such as rubber, for example.

The friction clutch which is connected to the planetary gear system is disposed about the same stationary shaft as the planetary gear. In the construction according to the invention, the friction clutch comprises two annular coupling parts, which are disposed one above the other in the direction of the stationary shaft, and a third coupling part which is connected to the planet carrier, the contact surfaces of which parts face one another. Friction elements, which may advantageously consist of a felt material, are disposed between these contact surfaces.

Means which can lock the coupling parts are provided to prevent one or more of the coupling parts from rotating and thus enable the coupling force to be set at different magnitudes for the different operating states. The action of the friction clutch is thereby adapted to all operating states such that the required torque is provided for each operating state.

The planet carrier is disposed above one of the annular coupling parts. There is no friction element between the planet carrier and this coupling part, although there is a compression spring which is supported at one side against the planet carrier and at the other against a disc sliding on the coupling part. A certain friction is inevitable in a sliding connection of this kind. Although a sliding friction between the disc and the coupling part is not required and therefore not an objective, it does not cause any trouble, as it can be taken into account when calculating the overall friction.

The planet wheels, which are constructed as toothed wheels, of the planetary gear system can rotate freely on their shafts, being in mesh on the drive side with a sun wheel driven by the drive element and on the in drive side with a ring gear driving the tumbler gear and thus the respective winding spool.

The planet carrier rotates automatically in accordance with the transmission torque. In the process the planet carrier entrains the coupling part which is connected to it. If the planet carrier is locked by locking means, advantageously a locking slide bar, a predetermined transmission torque is delivered directly from the drive part to the winding spools via the planet wheels and the ring gear, e.g. when rewinding.

The fact that differences in the strength of the compression spring supported between the planet carrier and the coupling part have hardly any effect on the required coupling properties has proved to be another advantage. It is possible, for example, to use a relatively cheap spring material with relatively wide tolerances and a flat spring characteristic.

A magnetic tape cassette recorder in accordance with an inventive arrangement comprises: take-up and feed spools for winding and unwinding a magnetic tape carried in a removable cassette; a tumbler gear mounted for swinging motion about a stationary shaft and movable between the take-up and feed spools; a motor, disposed outside the cassette when the cassette is operatively inserted in the recorder, for selectively driving the take-up and feed spools through the tumbler gear; a capstan driven by the motor; a pinch roller for pressing the magnetic tape against the capstan; a transmission mechanism driven by the motor and having a planetary gear assembly, including a planet carrier, for driving the tumbler gear; first and second annular coupling parts rotatably stacked along the stationary shaft; a third coupling part connected to the planet carrier and rotatably stacked between the first and second coupling parts, defining respective sets of opposing facing surfaces between the third coupling part and each of the first and second coupling parts; a frictional element stacked between each of the respective sets of opposing facing surfaces; and, means for selectively preventing: one of the first and second coupling parts from rotating; and, both of the first and second coupling parts from rotating, thereby controlling coupling forces driving the take-up and feed spools under different operating modes.

A friction clutch for a magnetic tape cassette recorder in accordance with another inventive arrangement has a motor for driving take-up and feed spools through a transmission mechanism including a planetary gear assembly and a tumbler gear. The friction clutch comprises: first and second annular coupling parts rotatably stacked along a stationary shaft supporting the tumbler gear for swinging motion; a third coupling part connected to a planet carrier of the planetary gear assembly and rotatably stacked between the first and second coupling parts, defining respective sets of opposing facing surfaces between the third coupling part and each of the first and second coupling parts; a frictional element stacked between each of the respective sets of opposing facing surfaces; and, means for selectively preventing: one of the first and second coupling parts from rotating; and, both of the first and second coupling parts from rotating, thereby controlling coupling forces driving the take-up and feed spools under different operating modes.

In accordance with both inventive arrangements, the planet carrier may be rotatably stacked above the uppermost one of the stacked annular coupling parts. The uppermost one of the annular coupling parts and the planet carrier have no friction element disposed therebetween.

Each of the first and second annular coupling parts may comprise holding means for engagement with the preventing means. The preventing means may comprise a locking slide bar which engages the holding means in a predetermined order.

The preventing means may also selectively prevents rotation of both of the first and second coupling parts and the planet carrier. Each of the first and second annular coupling parts and the planet carrier may comprise holding means for engagement with the preventing means. The preventing means may comprise a locking slide bar which engages the holding means in a predetermined order.

The planetary gear assembly, the first, second and third annular coupling parts and the friction elements may be manufactured into a housing which can be mounted on a board as an integrated unit, for example, the same board on which the capstan motor is mounted. The capstan motor may drive the planetary gear assembly through a pulley and belt arrangement.

DETAILED DESCRIPTION OF THE PREFERRED EMBODIMENTS

Figure 1:
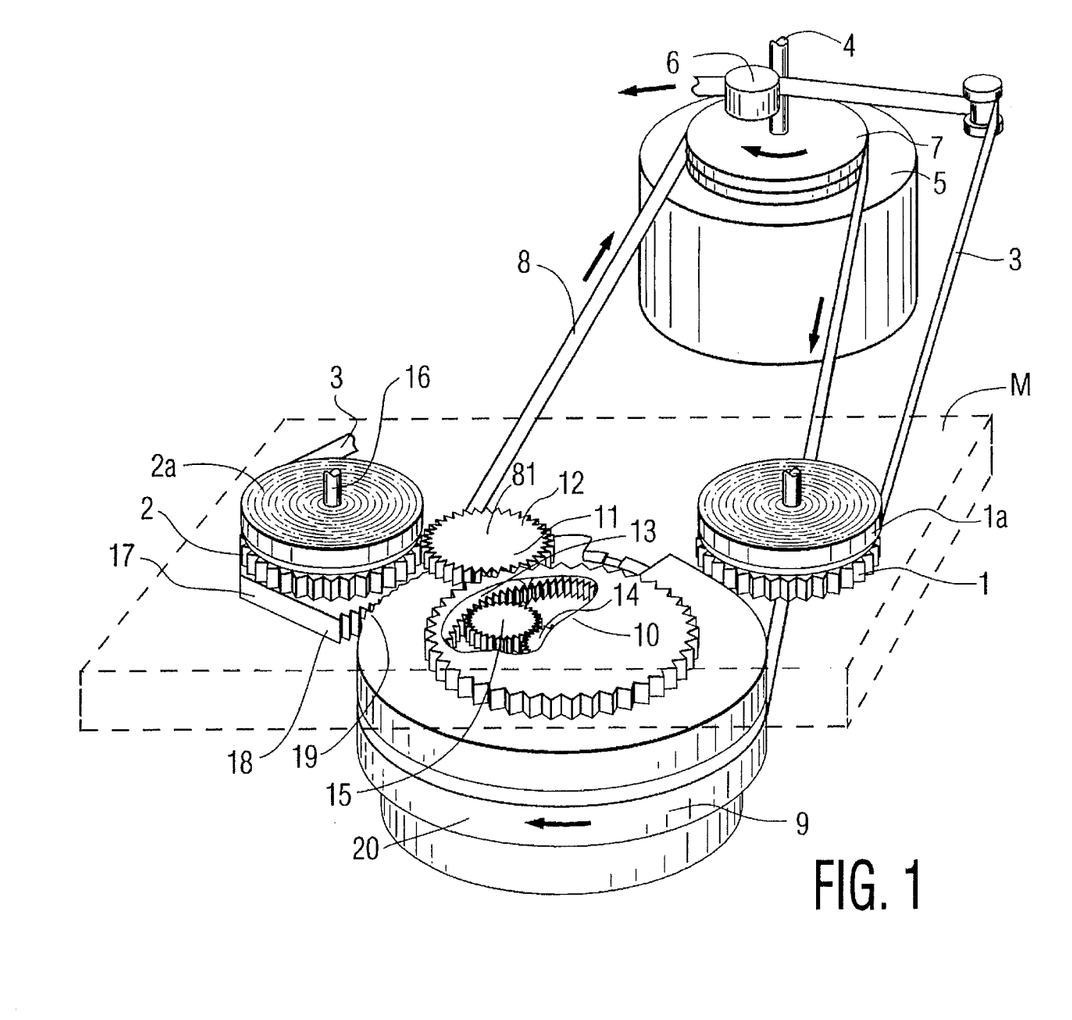
FIG. 1 is a diagrammatic perspective view of the part of a magnetic tape cassette recorder according to the invention.

Corresponding parts in different Figures have been given the same reference numerals FIG. 1 is a perspective view of two winding spools 1, 2 of a magnetic tape cassette recorder which are disposed next to one another and on which the separate magnetic tape cassette M, which is only indicated, is placed for operation. The magnetic tape 3, which is only indicated, leads to the right-hand winding spool 1 or the spooled tape Ia placed on the latter via the capstan 4 of the capstan motor 5. A pinch roller 6, preferably a rubber pinch roller, presses the magnetic tape 3 against the capstan 4 of the capstan motor 5 disposed below. A pulley 7 is disposed on the same capstan 4 of the capstan motor 5 below the point at which the pinch roller 6 presses the magnetic tape 3 against the capstan 4.

The pulley 7 carries the drive element, preferably a belt 8, which is connected to the driven part, preferably another pulley 9 of the planetary gear system. The belt 8 winds around the two pulleys 7, 9.

The pulley 9 rotates about the stationary shaft 10. The shaft 10 is disposed between the feed spool 2 and the take-up spool 1 at a distance from the two winding spools 1, 2. A pivot arm 11 is pivotably mounted about this shaft 10. A tumbler gear 12 is rotatably mounted on the pivot arm 11. The distance of the shaft 10 from the winding spools is such that the tumbler gear 12, which is mounted on the pivot arm 11 such that it can rotate about the shaft 81, can engage both with the take-up spool 1 and with the feed spool 2. In FIG. 1, which shows the "search backward" operating ,mode, the tumbler gear 12 is bearing against the feed spool 2.

A ring gear 13 is also rotatably mounted on the stationary shaft 10. The winding spools 1, 2 are driven from the capstan motor 5 via the capstan 4, the pulley 7, the belt 8, the pulley 9 and the planetary gear system. The latter consists of the sun wheel 14, which is preferably integral with the pulley, the planet wheels 15 and the ring gear 13. The ring gear 13 transmits the power to the tumbler gear 12, which is engaged with one of the winding spools 1, 2.

A moving lever 17, which can rotate about the shaft 16 of the feed spool 2, is disposed below the latter and mounted such that it can be shifted by a control shift member 55 (FIG. 4) which can be shifted in accordance with the selected operating state. The moving lever 17 comprises a toothed part 18, which meshes with a toothed part 19 of a coupling part 20. The coupling part 20 is mounted such that it can rotate about the shaft 10 and is disposed on the shaft 10 below the ring gear 13 and below the sun wheel 14. The coupling part 20 can rotate about the stationary shaft 10 by means of the moving lever 17, while the pivot arm 11, which is rigidly connected to the coupling part 20 via a holding plate 39 (FIG. 3), can be made to engage via the tumbler gear 12, which is disposed on it, with the respective other winding spool 1, 2.

This manner of pivoting the pivot arm 11 is used when changing from play to review or vice versa. The pivot arm 11 may, however, also be pivoted solely by reversing the direction of rotation of the capstan motor, e.g. for rewind mode.

Figure 2:
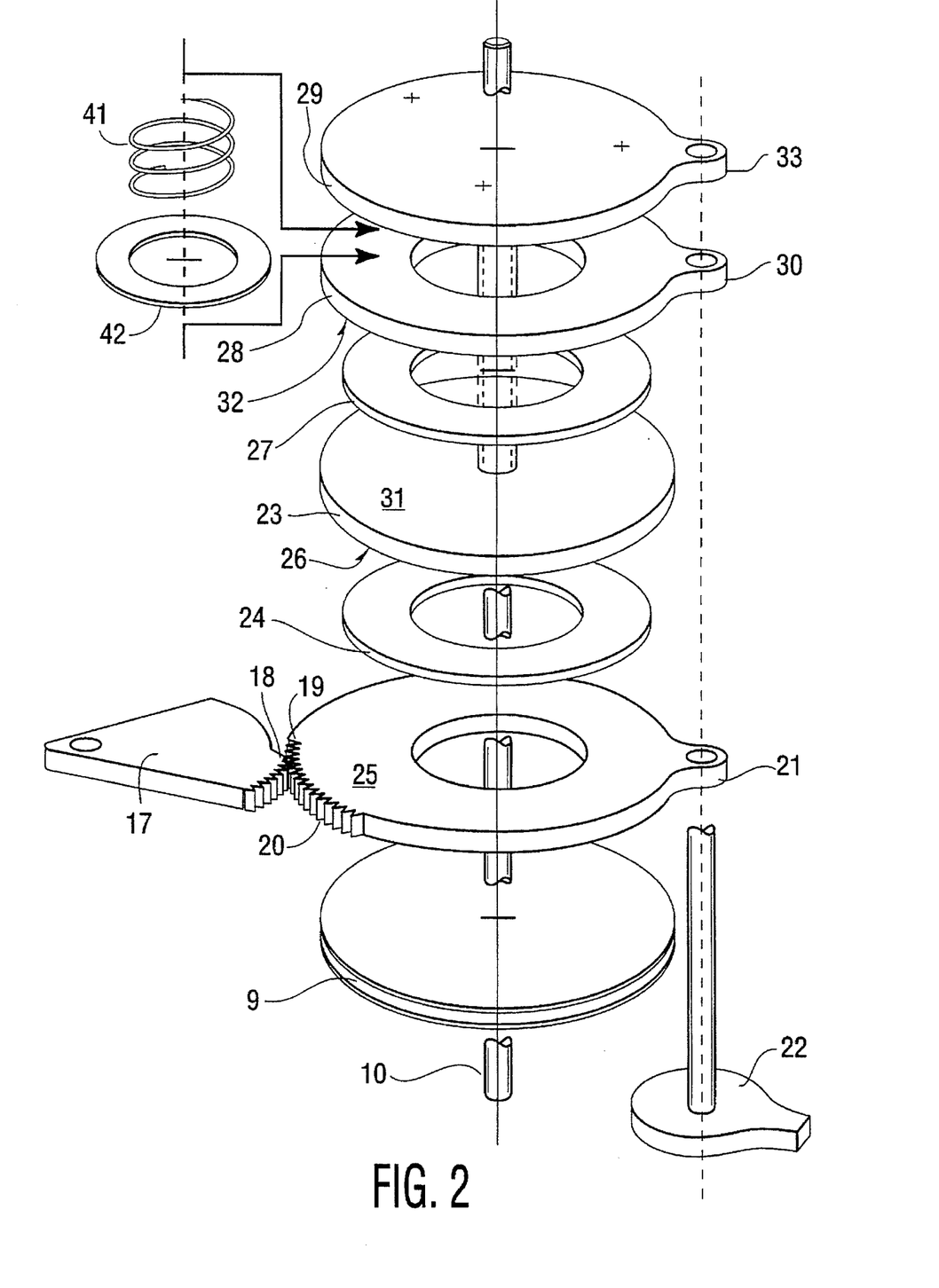
FIG. 2 is a diagrammatic view of a friction clutch arrangement according to claim 1.

FIG. 2 is an exploded and simplified view of a friction clutch arrangement according to the invention as shown in FIG. 1. The pulley 9 is rotatably mounted as bottom element on the stationary shaft 10. A coupling part 20 is mounted above this, with which part a holding means 21, which is attached on one side of the coupling part, is associated. A locking slide bar 22 can be passed through this holding means 21 in order to prevent the coupling part 20 from rotating.

A coupling part 23, called third coupling part 23 in the following, is mounted on the shaft 10 above the coupling part 20 such that it is connected to the planet carrier 29. No holding means 21 is associated with this third coupling part 23. A friction element 24, preferably a felt ring, is disposed between the coupling part 20, called first coupling part 20 in the following, and the third coupling part 23. This friction element 24 may be disposed separately or on one of the opposite contact surfaces 25, 26 of the coupling parts 20, 23.

The moving lever 17 holds the first coupling part 20 via the meshing tooth systems 18–19. When the pulley 9 is driven the planet wheels 15 and the ring gear 13 are firstly made to rotate via the sun wheel 14. The pivot lever 11 then pivots according to the direction of rotation of the capstan motor 5 towards the respective winding spool 1, 2. The tape 3, which is moved between the capstan 4 and the pinch roller 6, is wound up. On account of the relatively high gear ratio which is selected, the reel which is winding up attempts to wind up more tape than is released by the capstan 4 and the pinch roller 6, so that the planet carrier 29 is made to rotate with the third coupling part 23. A corresponding torque is then produced at the driven winding spool, according to the spring power and the diameter of the felt ring 24. The torque at the winding spool 1 or 2 which is driven at the time is the same in both drive directions (play/review).

A further coupling part 28 is mounted on the shaft 10 above the third coupling part 23, this being called the second coupling part 28 in the following. A friction element 27, preferably a felt ring, is disposed between this part 28 and the third coupling part 23, this being called the second friction element 27 in the following. A holding means 30, in which the locking slide bar 22 can engage, is disposed on one side of this second coupling part 28. The second friction element 27 acts on the contact surfaces 31, 32 in the same way as the friction element 24, which is called the first friction element 24 in the following, acts on the contact surfaces 25, 26. If the second coupling part 28 is locked by the locking slide bar 22, the third coupling part 23 is braked more strongly than in the case in which only the first coupling part 20 is locked.

The planet carrier 29 is mounted above the second coupling part 28. A compression spring 41 and a disc 42 are disposed concentrically between the second coupling part 28 and the planet carrier 29. An additional frictional torque is produced between the disc 42 and the second coupling part 28, which contributes to the overall torque, in review mode, when the coupling part 28 is locked by the locking slide bar 22. At one side of the planet carrier 29 there is arranged a holding means 33, which can be locked by the locking slide bar 22. If the planet carrier 29 is locked by the locking slide bar 22, the entire friction clutch is rendered inoperative. This is necessary in rewind mode.

Figure 3:
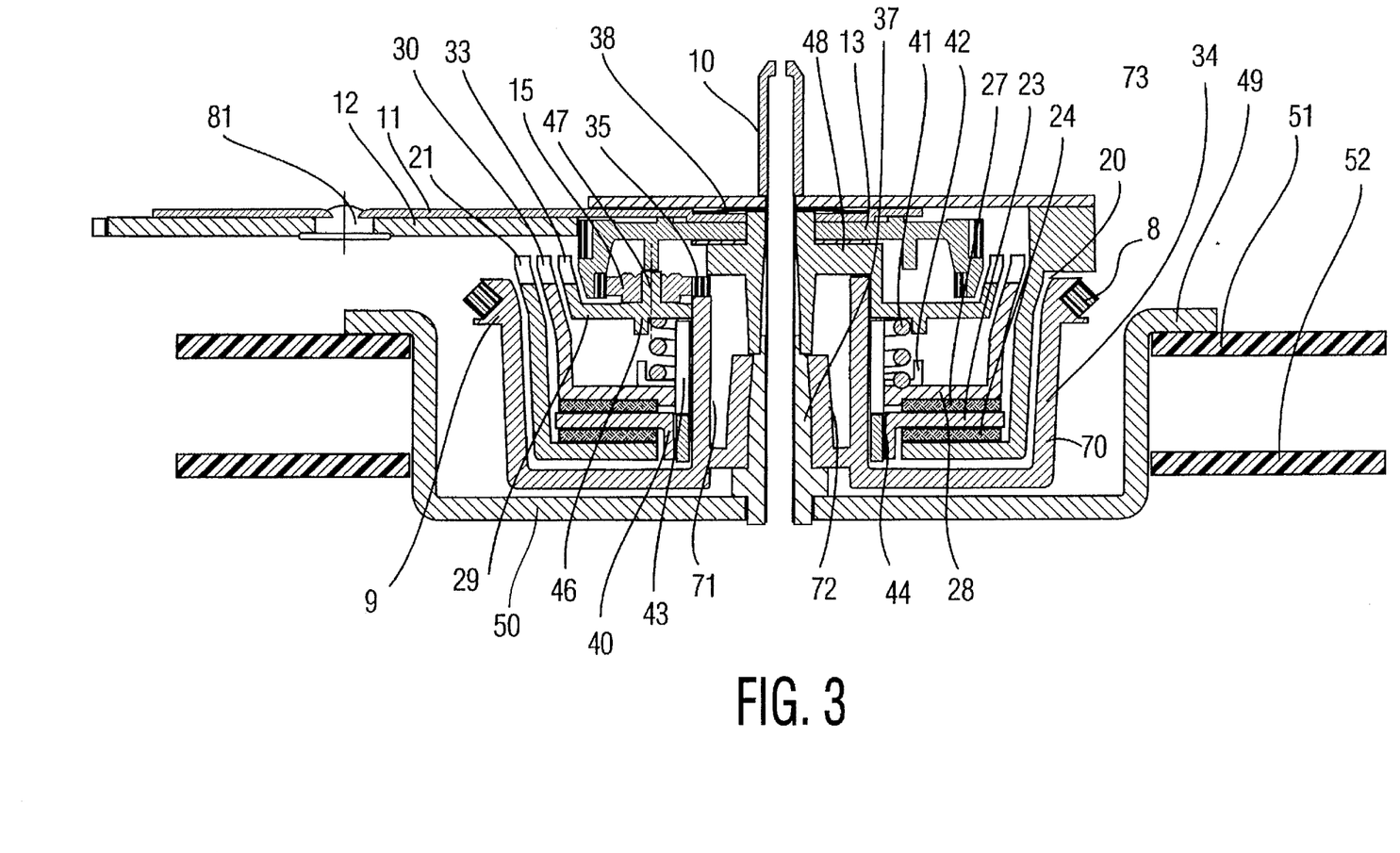
FIG. 3 is a vertical section through an embodiment of the friction clutch arrangement according to the invention.

FIG. 3 is a vertical section through a friction clutch arrangement according to FIG. 2. As in the case of FIG. 2, the coupling parts 20, 23, 28 and the planet carrier 29 are mounted one above the other on the stationary shaft 10. The bottom, driven element 34, which is rotatably mounted on the shaft 10, comprises the pulley 9. This element 34 is pot-shaped with an outer wall 70, which comprises the pulley 9 for carrying the belt 8, and an inner wall 71, which faces the shaft 10. The inner wall 71, which extends essentially parallel to and at a distance from the shaft 10, comprises at its upper edge a tooth system 35, which corresponds to the tooth system of the sun wheel 14. The wall 72, which faces the shaft 10, of the pot-shaped element 34 could be used directly for mounting on the shaft 10 or an adjacent bush 37.

The planet carrier 29 is supported on the bush 37 and the wall 72, being rotatably mounted on the upper circulating part of the bush 37 and the shaft 10. A spring washer 38, which is disposed above the planet carrier 29, supports this against a holding plate 39. The spring washer 38 serves to produce a torque acting on the pivot arm 11, so that this pivots according to the direction of rotation towards the corresponding spool 1, 2. This torque constitutes a torque loss, which is taken into account when calculating the overall torque. The holding plate 39 is connected at its outer edge at least in part to the stationary, first coupling part 20, which is disposed above the element 34 and the pulley 9. At the edges of the parts 39 and 20 which connect these parts the circumferential edge 73 of the first coupling part 20 is formed in a thickened and projecting manner. A component piece 21 of the edge 73 may be formed as an opening in order to allow a locking slide bar 22 to pass through.

The circumferential part, which is disposed below the upper edge 73, of the first coupling part 20 is essentially parallel with the walls 70, 71 of the pot-shaped element 34 in the inner region of the latter and thus also pot-shaped. The inner edge, which points towards the shaft 10, of the first coupling part 20 is supported neither on the inner wall of the pot-shaped element 34 nor on the shaft 10 or the planet carrier 29.

The connection between the first coupling part 20 and the third coupling part 23, which is disposed above the latter, is provided by a first friction element 24, which can be secured to one of the coupling parts 20, 23. The first friction element 24 is annular and extends from the inner edge, which is directed towards the shaft 10, of the first coupling part 20 approximately to the outer edge, which is directed away from the shaft 10, of the third coupling part 23.

The third coupling part 23 is disposed on a neck 44, which surrounds the shaft 10 in the form of a bush, of the planet carrier 29 via an approximately bush-shaped component piece 40 extending parallel to the shaft 10. The third coupling part 23 and the planet carrier 29 are rigidly connected together, for example by a groove 43 and a tongue 40. The third coupling part 23 is thus entrained by the planet carrier 29 when the latter rotates, although is displaceably mounted in the vertical direction in order to allow the friction to be adjusted or readjusted. The part of the third coupling part 23 which is bent at a right angle is in the form of a disc in the horizontal direction, without being bent upwards in the shape of a pot parallel to the shaft 10 and the first coupling part 20.

A further, second friction element 27 is disposed above the third coupling part 23. This element extends in an annular manner, parallel to the first friction element 24, preferably having the same dimensions.

A further, second coupling part 28 is disposed above the second friction element 27. Although there is a connection between this part and the planet carrier 29, this is in the form of a sliding connection. The second coupling part 28 is pressed onto the second friction element 27 by means of a compression spring 41. The second coupling part 28 is pot-shaped and extends parallel to the first coupling part 20. The upper circumferential edge of the wall which here is of a uniform thickness o of the second coupling part 28 comprises holding parts 30 for preventing the second coupling part 28 rotating by means of a locking slide bar.

The compression spring 41 is supported between the planet carrier 29 disposed above and a plate element 42, which is mounted in a sliding manner on the second coupling part 28 and is engaged with the planet carrier 29. The plate element 42 is mounted such that it can be displaced vertically in a groove 43 in the plate carrier 29. As the plate element 42 and the third coupling part 23 can be displaced vertically and in the guide groove 43 in the planet carrier 29, the frictional force of the two friction elements 24, 27 is adjusted by means of the compression spring 41.

The planet carrier 29 comprises a neck 44, which extends coaxially with the shaft 10 and is supported in a sliding manner at the pulley 9. This neck comprises the above mentioned guide grooves 43. The horizontal part 45, which extends round in the form of a disc, of the planet carrier 29 comprises at its underside a projecting, circulating edge 46. This edge 46 and the bent-over edge of the plate element 42 form the boundary for the compression spring 41.

Cams 47, which correspond in number to the planet wheels 15 and on which the planet wheels 15 are mounted, are supported on the surface of the disc-shaped part 45.

The planet carrier 29, which—like the coupling parts 20, 28 is pot-shaped, comprises at its upper edge holding means 33 for preventing it from rotating via the locking slide bar 22.

The planet wheels 15 mounted on the surface of the planet carrier 29 are in mesh on one side with the sun wheel 14, which is attached to the pulley 9, and on the other with the ring gear 13. The ring gear is mounted on the planet carrier 29 such that it can rotate about the shaft 10. A ring 48, which is disposed between the underside of the ring gear 13 and a surface of the planet carrier 29, enables the ring gear 13 to rotate through a sliding connection.

The ring gear 13 drives via its circumference a tumbler gear 12, which in turn drives the winding spool 1, 2 applied at the time. This tumbler gear 12 can be swung about the stationary shaft 10 via a pivot arm 11, which is mounted on the planet carrier 29 above the ring gear 13 and carries the tumbler gear 12. The tumbler gear 12 can engage with the respective winding spool 1, 2 to drive the latter.

The entire arrangement can be mounted in a pot-shaped housing 49. For this purpose the bush 37 disposed about the shaft 10 is not-rotatably mounted in the bottom of the housing 49. The housing 49 may be secured at its upper edge in the board 51 for mounting the tape drive. The friction clutch arrangement and the capstan motor 5 can thus be mounted on one board. The board 52 for the electronic components, e.g. for controlling the capstan motor 5, is disposed, for example, below the board 51 for mounting the tape drive.

Figure 4:
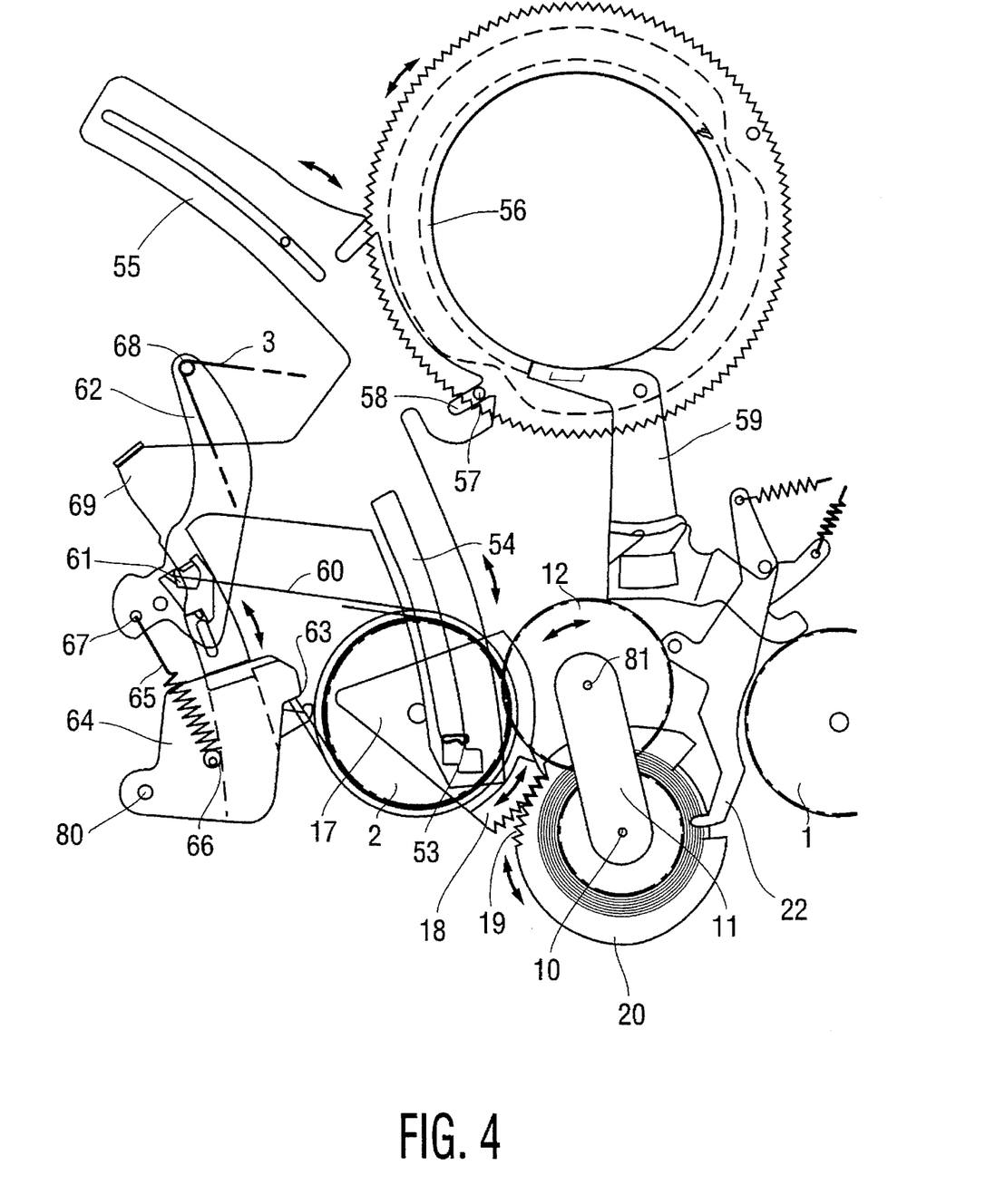
FIG. 4 is a plan view of an embodiment of the invention according to FIG. 3.

FIG. 4 is a plan view of an entire arrangement with two winding spools 1, 2 disposed next to one another. The friction clutch arrangement from FIG. 3, which is rotatably mounted about the shaft 10, is disposed at a certain distance from these winding spools 1, 2. The tumbler gear 12 is engaged with the feed spool 2 on the left-hand side. In this position the locking slide bar 22 projects from outside through the opening 21 in the first coupling part 20 (FIG. 3) and locks the coupling part 28 by engaging in its holding part 30. The toothed part 19 on the first coupling part 20 is in mesh with the toothed part 18 of the moving lever 17. The moving lever 17 is mounted such that it can rotate about the shaft 16 of the feed spool 2. A lug 53 disposed on the surface of the moving lever 17 is guided in a guide groove 54 in a control shift member 55.

The position of the moving lever 17 can be adjusted by means of the control shift member 55. If the control shift member 55 in FIG. 4 is moved towards the lug 53 of the moving lever 17, the moving lever 17 turns clockwise. As a result of the toothed parts 18, 19 of the moving lever 17 and the first coupling part 20 meshing, the latter and thus the friction clutch arrangement move anti clockwise. The tumbler gear 12 therefore swings from the take-up spool 1 to the feed spool 2.

If the control shift member 55 is moved away from the feed spool 2, it entrains the lug 53 of the moving lever 17. The tumbler gear 12 is accordingly swung towards the take-up spool 1.

A loading ring 56 controls the positions of the control shift member 55. For this purpose the loading ring 56 preferably comprises on its underside guide pins 57, with which the control shift member 55 can engage by way of another guide groove 58. The rotation of the loading ring 56 anti clockwise causes the control shift member 55 to move towards the lug 53 of the moving lever 17.

A control lever 59, which engages in a curved recess in the loading ring 56, controls an auxiliary brake, which is not shown and brakes the winding spool 1 in review mode. The control lever 59 could also control main and auxiliary brakes, which are not shown and prevent the magnetic tape 3 from being wound off the take-up spool 1. The locking slide bar 22 is also controlled by the control lever 59 in accordance with the desired operating state.

The loading ring 56 is driven or rotated by a loading motor or threading motor, which is not shown. The degree of rotation is determined by the desired operating state, which activates a code switch, which is not shown. This acts on the loading motor.

A brake band 60, which winds around the feed spool 2, is provided to ensure that the tape tension at this winding spool 2 is almost constant. The brake band 60 bears at one end against a lug-like projection 61 of a tape tension sensing lever 62. At its other end it is in contact with a projection 63 of a brake band release lever 64. The tape tension sensing lever 62 and the brake band release lever 64 are connected together by means of a spring 65. This embraces a projecting pin 66 on the surface of the brake band release lever 64 and is secured to the tape tension sensing lever 62 in a hole 67.

The arm of the tape tension sensing lever 62 comprises a pin 68, around which the magnetic tape 3 is wound. The tension of the magnetic tape 3 can be controlled by the rotatable mounting of the tape tension sensing lever, supplemented by the arrangement consisting of the brake band 60, the brake band release lever 64 and the control shift member 55. The control shift member 55 is formed such that it can press by way of an arm 69 against the brake band release lever 64. The brake band 60 is as a result loosened and the tape tension equally reduced. If the arm 69 of the control shift member 55 is not pressing against the brake band release lever 64, the tape tension is determined by the tension of the brake band 60 or the spring 65 between the brake band release lever 64 and the tape tension sensing lever 62.

The configurations of the arrangement in the various operating states are illustrated in detail in the following with reference to the drawings described above.

1. Playback mode/search forward

This operating state requires a weak transmission torque which is to be delivered by the capstan motor 5 to the winding spool 1. The moving lever 17, the tooth system 18 of which meshes with the tooth system 19 of the first coupling part 20, holds the latter fast. The first friction element 24 between this first coupling part 20 and the second coupling part 23 is thus operative. The third coupling part 23 is initially held fast according to the contact pressure which is applied. On account of the connection between the third coupling part 23 and the planet carrier 29, the latter is also initially held fast. The third coupling part 23 does not start to slip until there is an increase in the torque transmitted from the driving pulley 9. The planet carrier 29 automatically rotates in the direction of the drive part of the pulley 9. The torque which can be transmitted to the drive part, the tumbler gear 12, is thus limited by means of the friction clutch. This accordingly tensions the tape at the take-up spool 1.

The tumbler gear 12 bears against the take-up spool 1 during playback or search forward mode.

2. Search backward

In this operating state, as from a certain reel diameter, a greater torque has to be transmitted from the drive part, the pulley 9, to the driven part, the tumbler gear 12 or the winding spool 2. For this purpose both the first coupling part 20 and the second coupling part 28 are locked by the locking slide bar 22 and thus prevented from rotating.

The friction elements 24, 27 are operative. The third coupling part 23 is thus held fast by the two friction elements 24, 27. The planet carrier 29 is also held fast, as described above. The amount of frictional force obtained through the friction elements 24, 27 is greater than in the case of playback mode as described above. The third coupling part 23 does not initially slip as the torque delivered by the drive part increases. The third coupling part 23 does not slip until a limit, which can be set by the contact pressure of the coupling parts 20, 23, 28 against the friction elements 24, 27, is exceeded. The planet carrier 29 again rotates automatically in the direction of the drive part. The transmissible torque is thereby again limited here and the tape tension at the feed spool 2 guaranteed.

The tumbler gear 12 bears against the feed spool 2 in search backward mode.

3. Rewind forward and backward

The first coupling part 20, the second coupling part 28 and the planet carrier 29 are locked by means of the locking slide bar 22 in this operating state. The friction clutch is thus bypassed and the torque transmitted directly from the drive part, the pulley 9, to the ring gear 13 via the planet wheels 15 and from the ring gear to the tumbler gear 12 and the respective winding spool 1, 2.

Rewinding is carried out either with the magnetic tape 3 completely threaded and the pinch roller 6 lifted off or with a semi-threaded magnetic tape 3, i.e. the magnetic tape is bearing against the AC head, which is not shown in the drawings, or with the magnetic tape unthreaded.

4. Reversal of rotation

In order to reverse the direction of rotation of the winding spools 1, 2 from playback mode to "search backward" mode, the pinch roller 6 remains at the capstan 4 of the capstan motor 5. The capstan motor 5 is brought into a stop position and the brake band 60 is tensioned, i.e. the control shift member 55 presses against the lug 53 of the moving lever 17 and not against the projection 63 of the brake band release lever 64. The loading motor, which is not shown, is activated by the code switch, which is not shown either, thus causing the loading ring 56 to rotate anti clockwise. The control shift member 55 thereby moves towards the lug 53 of the moving lever 17. This moves clockwise and entrains the toothed part 19, which is in mesh with its toothed part 18, of the first coupling part 20. The first coupling part 20 is as a result rotated anti clockwise about the stationary shaft 10. Because the first coupling part 20 is connected to the holding plate 39, the latter is also rotated about the shaft 10. As the holding plate 39 and the pivot arm 11 are connected via the spring washer 38, the pivot arm 11 is pivoted when the holding plate 39 rotates about the shaft 10. The tumbler gear 12, which is disposed on the pivot arm 11, therefore engages with the feed spool 2. The brake band 60 is thereby relieved of tension by the lug 53 in the guide groove 58 in the control shift member 55 reaching a position which is such that the arm 69 of the control shift member 55 strikes against the brake band release lever 64. This is as a result rotated clockwise about the stationary shaft 80 of the brake band release lever 64. The projection 63 of the brake band release lever 64 presses against the brake band 60 and relieves it of tension.

The procedure on the take-up side corresponds to that above. The control lever 59 prevents the magnetic tape 3 from winding off the take-up spool 1 while the tumbler gear 12 swings between the winding spools 1, 2 either directly or by activating brakes.

The procedure for the reverse case of reversing the rotation from "search backward" to playback mode corresponds to that described above, with the tumbler gear 12 initially remaining in engagement with the feed spool 2. As the arm 69 of the control shift member 55 no longer presses against the brake band release lever 64, the brake band 60 is tensioned again by the spring 65 secured between the brake band release lever 64 and the tape tension sensing lever 62. This ensures that the tape is tensioned and prevents the magnetic tape 3 from winding off the feed spool 2.

The brake band 60 remains operative during playback and controls the tension of the magnetic tape 3 via the tape tension sensing lever 62.

What is claimed is:

1. A magnetic tape cassette recorder, comprising:

take-up and feed spools for winding and unwinding a magnetic tape carried in a removable cassette loaded in a cassette loaded position;

a tumbler gear mounted for swinging motion about a stationary shaft to selectively engage said take-up and feed spools;

a motor disposed outside said cassette loaded position;

means for swinging said tumbler gear between said take-up and feed spools;

a capstan driven by said motor;

a pinch roller for pressing said magnetic tape against said capstan;

a transmission mechanism coupling said motor to said tumbler gear, said transmission mechanism having a planetary gear assembly, including a planet carrier;

first and second annular coupling parts rotatably stacked along said stationary shaft;

a third coupling part connected for rotation with said planet carrier and rotatably stacked along said shaft and between said first and second coupling parts, defining respective sets of opposing facing surfaces between said third coupling part and each of said first and second coupling parts;

a frictional element stacked between each of said respective sets of opposing facing surfaces and in engagement therewith; and, means for selectively preventing one of said first and second coupling parts from rotating, creating a first amount of frictional drag for retarding but not stopping rotation of said third coupling part and said planet carrier connected thereto, or preventing both of said first and second coupling parts from rotating, creating a second amount of frictional drag for retarding but not stopping rotation of said third coupling part and said planet carrier connected thereto, thereby controlling coupling forces between said motor and said take-up and feed spools under different modes of operation.

2. A magnetic tape cassette recorder according to claim 1, wherein said planet carrier is rotatably stacked above the one of said stacked annular coupling parts which is uppermost.

3. A magnetic tape cassette recorder according to claim 2, wherein said planet carrier and said uppermost one of said annular coupling parts have no fiction element disposed therebetween.

4. A magnetic tape cassette recorder according to claim 1, wherein each of said first and second annular coupling parts comprises holding means for engagement with said preventing means.

5. A magnetic tape cassette recorder according to claim 4, wherein said preventing means comprises a locking slide bar which engages said holding means in a predetermined order.

6. A magnetic tape cassette recorder according to claim 1, wherein said preventing means comprises means to selectively prevent rotation of both of said first and second coupling parts and said planet carrier.

7. A magnetic tape cassette recorder according to claim 1, wherein each of said first and second annular coupling parts and said planet carrier comprises holding means for engagement with said preventing means.

8. A magnetic tape cassette recorder according to claim 7, wherein said preventing means comprises a locking slide bar which engages said holding means in a predetermined order.

9. A magnetic tape cassette recorder according to claim 1, wherein said frictional elements comprise a felt material.

10. A magnetic tape cassette recorder according to claim 1, wherein said motor drives said transmission mechanism through a belt-driven pulley.

11. A magnetic tape cassette recorder according to claim 1, further comprising:

a lever mounted on said stationary shaft and bearing said tumbler gear for said swinging motion; and, means coupled to a toothed part driven by one of said coupling parts for moving said lever.

12. A magnetic tape cassette recorder according to claim 1, wherein said planetary gear assembly, said first, second and third coupling parts and said friction elements are integrated into a housing which can be mounted on a board as an integrated unit.

13. A magnetic tape cassette recorder according to claim 12, wherein said motor is mounted on said same board.

14. A drive arrangement for a magnetic tape cassette recorder having take-up and feed spools, said drive arrangement comprising:

a motor;

a transmission mechanism having a planetary gear assembly including a planet carrier, a tumbler gear and a stationary shaft rotatably supporting said planet carrier, said transmission mechanism being driven by said motor, and in turn, selectively driving said take-up and feed spools through said tumbler gear;

first and second annular coupling parts rotatably stacked along said stationary shaft;

a third coupling part connected to said planet carrier of said planetary gear assembly and rotatably stacked on said stationary shaft between said first and second coupling parts, defining respective sets of opposing facing surfaces between said third coupling part and each of said first and second coupling parts;

a frictional element stacked between each of said respective sets of opposing facing surfaces; and, means for selectively preventing one of said first and second coupling parts from rotating, creating a first amount of frictional drag for retarding but not stopping rotation of said third coupling part and said rotatably mounted member connected thereto, or preventing both of said first and second coupling parts from rotating, creating a second amount of frictional drag for retarding but not stopping rotation of said third coupling part and said rotatable member connected thereto, thereby controlling coupling forces between said motor and said take-up and feed spools under different modes of operation.

15. A drive mechanism according to claim 14, wherein said preventing means also selectively stops rotation of said first and second coupling parts and said planet carrier.

16. A drive arrangement according to claim 14, wherein said planet carrier is rotatably stacked above the one of said stacked annular coupling parts which is uppermost on said stationary shaft.

17. A drive mechanism according to claim 16, wherein said planet carrier and said uppermost one of said annular coupling parts have no frictional element disposed therebetween.

18. A drive mechanism according to claim 14, wherein each of said first and second annular coupling parts comprises holding means for engagement with said preventing means.

19. A drive mechanism according to claim 18, wherein said preventing means comprises a locking slide bar which engages said holding means in a predetermined order.

20. A drive mechanism according to claim 14, wherein said friction elements comprise a felt material.

21. A drive mechanism according to claim 14, wherein each of said first and second annular coupling parts and said planet carrier comprises holding means for engagement with said preventing means.

22. A drive mechanism according to claim 21, wherein said preventing means comprises a locking slide bar which engages said holding means in a predetermined order.

23. A drive mechanism according to claim 14, manufactured with said planetary gear assembly as an integral unit having a common housing.

24. A drive mechanism according to claim 23, further comprising a pulley mounted on said stationary shaft for driving said planetary gear assembly.

* * * * *